United States Patent
Rowles et al.

(10) Patent No.: US 9,948,700 B2
(45) Date of Patent: Apr. 17, 2018

(54) ADFDI SUPPORT FOR CUSTOM ATTRIBUTE PROPERTIES

(71) Applicant: Oracle International Corporation, Redwood Shores, CA (US)

(72) Inventors: Brian Rowles, Acton, MA (US); Shi Li, Suzhou (CN)

(73) Assignee: Oracle International Corporation, Redwood Shores, CA (US)

( * ) Notice: Subject to any disclaimer, the term of this patent is extended or adjusted under 35 U.S.C. 154(b) by 262 days.

(21) Appl. No.: 14/753,459

(22) Filed: Jun. 29, 2015

(65) Prior Publication Data
US 2016/0004668 A1   Jan. 7, 2016

Related U.S. Application Data

(60) Provisional application No. 62/019,595, filed on Jul. 1, 2014.

(51) Int. Cl.
| | | |
|---|---|---|
| G06F 3/0484 | (2013.01) | |
| H04L 29/08 | (2006.01) | |
| G06Q 10/06 | (2012.01) | |
| G06Q 10/10 | (2012.01) | |

(52) U.S. Cl.
CPC .......... H04L 67/10 (2013.01); G06F 3/04847 (2013.01); G06Q 10/06 (2013.01); G06Q 10/10 (2013.01)

(58) Field of Classification Search
CPC .. G06F 3/0484; G06F 17/246; G06F 17/2247; G06F 17/211
See application file for complete search history.

(56) References Cited

U.S. PATENT DOCUMENTS

| | | |
|---|---|---|
| 6,230,318 B1 | 5/2001 | Halstead et al. |
| 6,266,058 B1 | 7/2001 | Meyer |
| 7,480,921 B1 | 1/2009 | Vigesaa et al. |
| 7,529,763 B2 | 5/2009 | Hulse et al. |
| 7,543,238 B2 | 6/2009 | Alcazar et al. |
| 7,546,602 B2 | 6/2009 | Hejlsberg et al. |
| 7,917,888 B2 | 3/2011 | Chong et al. |
| 8,099,710 B2 | 1/2012 | Hill et al. |
| 8,296,352 B2 | 10/2012 | Mazzaferri |
| 8,417,728 B1 | 4/2013 | Anders et al. |
| 8,489,640 B2 | 7/2013 | Schlarb et al. |
| 9,524,287 B2 | 12/2016 | Davis et al. |
| 2004/0046789 A1 | 3/2004 | Inanoria |
| 2005/0038629 A1 | 2/2005 | Amaru et al. |
| 2005/0183059 A1 | 8/2005 | Loksh et al. |
| 2007/0219956 A1 | 9/2007 | Milton |
| 2008/0222238 A1 | 9/2008 | Ivanov et al. |

(Continued)

OTHER PUBLICATIONS

U.S. Office Action issued in U.S. Appl. No. 14/861,792 dated Sep. 22, 2017, 9 pages.

(Continued)

*Primary Examiner* — Namitha Pillai
(74) *Attorney, Agent, or Firm* — Kilpatrick Townsend & Stockton LLP

(57) ABSTRACT

In various embodiments, methods, systems, and non-transitory computer-readable media are disclosed that expand the ability of integrated workbook developers to drive the integrated workbook experience from model metadata by defining custom properties on model attributes and then binding those custom properties to UI component properties in desktop UI components.

15 Claims, 11 Drawing Sheets

(56) References Cited

U.S. PATENT DOCUMENTS

| | | |
|---|---|---|
| 2008/0256554 A1 | 10/2008 | Yassin |
| 2009/0013244 A1 | 1/2009 | Cudich et al. |
| 2009/0064001 A1 | 3/2009 | Robbins |
| 2009/0171999 A1 | 7/2009 | McColl et al. |
| 2009/0183072 A1 | 7/2009 | Stephenson et al. |
| 2011/0087708 A1 | 4/2011 | Teichmann |
| 2011/0107196 A1 | 5/2011 | Foster |
| 2012/0036125 A1 | 2/2012 | Al-Kofahi et al. |
| 2014/0281943 A1 | 9/2014 | Prilepov et al. |
| 2015/0089340 A1 | 3/2015 | Logan et al. |
| 2015/0089341 A1 | 3/2015 | Davis et al. |
| 2015/0089342 A1 | 3/2015 | Davis et al. |
| 2015/0089350 A1 | 3/2015 | Davis et al. |
| 2015/0089351 A1 | 3/2015 | Logan et al. |
| 2016/0085735 A1 | 3/2016 | Davis et al. |
| 2017/0010870 A1 | 1/2017 | Davis et al. |
| 2017/0083503 A1 | 3/2017 | Davis et al. |
| 2017/0192944 A1 | 7/2017 | Davis et al. |

OTHER PUBLICATIONS

U.S. Appl. No. 14/333,105, Notice of Allowance dated Jun. 2, 2017, 8 pages.

U.S. Appl. No. 14/333,105, Non-Final Office Action dated Jun. 30, 2016, 22 pages.

U.S. Appl. No. 14/333,176, Final Office Action dated Jul. 8, 2016, 18 pages.

U.S. Appl. No. 14/333,176, Non-Final Office Action dated Dec. 21, 2015, 16 pages.

U.S. Appl. No. 14/333,205, Final Office Action dated Jul. 8, 2016, 17 pages.

U.S. Appl. No. 14/333,205, Non-Final Office Action dated Jan. 13, 2016, 15 pages.

U.S. Appl. No. 14/333,238, Non-Final Office Action dated Mar. 17, 2016, 14 pages.

Grossman et al., ToolClips: An Investigation of Contextual Video Assistance for Functionality Understanding, CHI 2010: Looking with Video, Apr. 10-15, 2010, pp. 1515-1524.

U.S. Appl. No. 14/333,238, Notice of Allowance dated Aug. 16, 2016, 11 pages.

U.S. Appl. No. 14/333,146, Non-Final Office Action dated Oct. 19, 2016, 26 pages.

U.S. Appl. No. 14/333,176, Advisory Action dated Oct. 18, 2016, 3 pages.

U.S. Appl. No. 14/333,176, Notice of Allowance dated Dec. 2, 2016, 11 pages.

U.S. Appl. No. 14/333,205, Advisory Action dated Oct. 18, 2016, 3 pages.

U.S. Appl. No. 14/133,205 Notice of Allowance dated Dec. 2, 2016, 11 pages.

U.S. Appl. No. 14/333,105, Final Office Action dated Jan. 25, 2017, 28 pages.

U.S. Appl. No. 14/333,146, Notice of Allowance dated May 3, 2017, 20 pages.

"Non-Final Office Action" issued in U.S. Appl. No. 15/203,247, dated Nov. 30, 2017, 10 pages.

"Non-Final Office Action" issued in U.S. Appl. No. 15/368,421, dated Oct. 5, 2017, 14 pages.

Saleh et al., "Pro JSF and HTML5—Building Rich Internet Components", Second Edition, Apress, 2013, pp. 1-384.

Zambon , "Beginning JSP, JSF and Tomcat—Java Web Development", Apress, Chapters 4, 5, 6, and 7, 2012, pp. 79-229.

FIG. 3D

| Status | Employee Name | Manager Name | Current Job Title | Eligible | Base Salary | Key |
|---|---|---|---|---|---|---|
| | Anderson, Pamela | Hayden, Joe | 10023-Software Development Manager | Eligible | 780000 | |
| | Angelo, Michael | White, Christopher | 17250-Product Mgmt/Strategy Sr Director-ProdDev | Eligible | 1300000 | |
| | Bassett, Bernadette | Vleet, Gerrit | 10009-Software Development Manager | Eligible | 680000 | |
| | Barnett, Stuart | Kurian, Peterson | 17160-Product Manager/Strategy 4 ProdDev | Eligible | 500000 | |
| | Bhattacharya, Varshika | Hoyden, Joe | 10566-Software Developer 3 | Eligible | 500000 | |
| | Brown, Mariah | Goud, Pragathi | 17250-Product Mgmt/Strategy Sr Manager-ProdDev | Eligible | 450000 | |
| | Brown, Felicia | Bassett, Bernadette | 10700-Applications Developer 2 | Eligible | 1300000 | |
| | Chanure, Sarat | Saran, Krushi | 10700-Applications Developer 3 | Eligible | 1300000 | |
| | Cheng, Stephen | Smith, David | 10700-Applications Developer 2 | Eligible | 1300000 | |
| | Christopher, William | Anderson, Pamela | 10700-Applications Developer 4 | Eligible | 1300000 | |
| | Conroy, Watson | Jacob, Mechelle | 10740-Applications Developer 4 | Eligible | 1300000 | |
| | Darsi, Divya | Iain, Shravanth | 10700-Applications Developer 5 | Eligible | 980000 | |
| | Douglas, Shane | Dutt, Diane | 17250-Product Mgmt/Strategy VP-ProdDev | Eligible | 980000 | |
| | Dutt, Diana | Brown, Robert | 10700-Applications Developer 5 | Eligible | 980000 | |
| | Gerstein, Franklin | Herman, George | 17250-Product Mgmt/Strategy 4 ProdDev | Eligible | 500000 | |
| | Gill, Adam | Brown, Mariah | 17250-Product Mgmt/Strategy 4 ProdDev | Eligible | 980000 | |
| | Goud, Pragathi | Douglas, Shane | 17250-Product Mgmt/Strategy Sr Director-ProdDev | Eligible | 500000 | |
| | Gupta, Sristi | Raj, Vidya | 10700-Applications Developer 3 | Eligible | 500000 | |
| | Hayden, Joe | Warne, Tom | 10009-Software Development Sr Manager | Eligible | 450000 | |
| | Herman, George | Parsons, Angela | 10009-Software Development Sr Manager | Eligible | 450000 | |
| | Jacob, Celina | Herman, George | 10700-Applications Developer 4 | Eligible | 780000 | |
| | Jacob, Nischelle | Vleet, Gerrit | 10023-Software Development Manager | Eligible | 780000 | |

ADFDI SUPPORT FOR CUSTOM ATTRIBUTE PROPERTIES

BACKGROUND OF THE INVENTION

ADF Desktop Integration extends the Oracle Application Development Framework into the world of desktop applications like Microsoft Excel. Application developers can rapidly develop integrated spreadsheets to allow users to access and edit critical business data. This framework integrates seamlessly with the web application's security and business logic infrastructure. It allows end users to edit their data without a live connection to the network. Once reconnected, ADF Desktop Integration can transparently upload and validate all user changes against the application's backend.

Accordingly, what is desired is to solve problems relating to providing support for custom attribute properties in spreadsheet software, some of which may be discussed herein. Additionally, what is desired is to reduce drawbacks relating to support for custom attribute properties in spreadsheet software, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, methods, systems, and non-transitory computer-readable media are disclosed that expand the ability of integrated workbook developers to drive the integrated workbook experience. Metadata can be modeled by defining custom properties on model attributes. The custom properties can then be bound to UI component properties.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 3D is another screenshot of a set of custom attribute properties defined on an attribute of a data model using an EL expression in one embodiment according to the present invention.

FIG. 3E is screenshot of a spreadsheet table at runtime that is associated with a UI component having a set of custom attribute properties in one embodiment according to the present invention.

DETAILED DESCRIPTION OF THE INVENTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Introduction

In embodiments, developers of integrated documents can create documents using native applications with highly dynamic integrations that are driven by model metadata of web applications. A developer can utilizes model attributes to drive UI components and interactions within the document. However, sometimes the standard set of model attributes is insufficient to provide full control of the UI experience. To further customize integrated documents, a desktop integration framework in embodiments includes evaluation support for custom attribute properties. A developer can author custom properties on model attributes. These custom properties can then be referenced within expressions that customize the UI experience at runtime. This is a significant improvement over previous solutions that required extensive and complicated server-side programming.

Desktop Integration Framework

Figure 1:
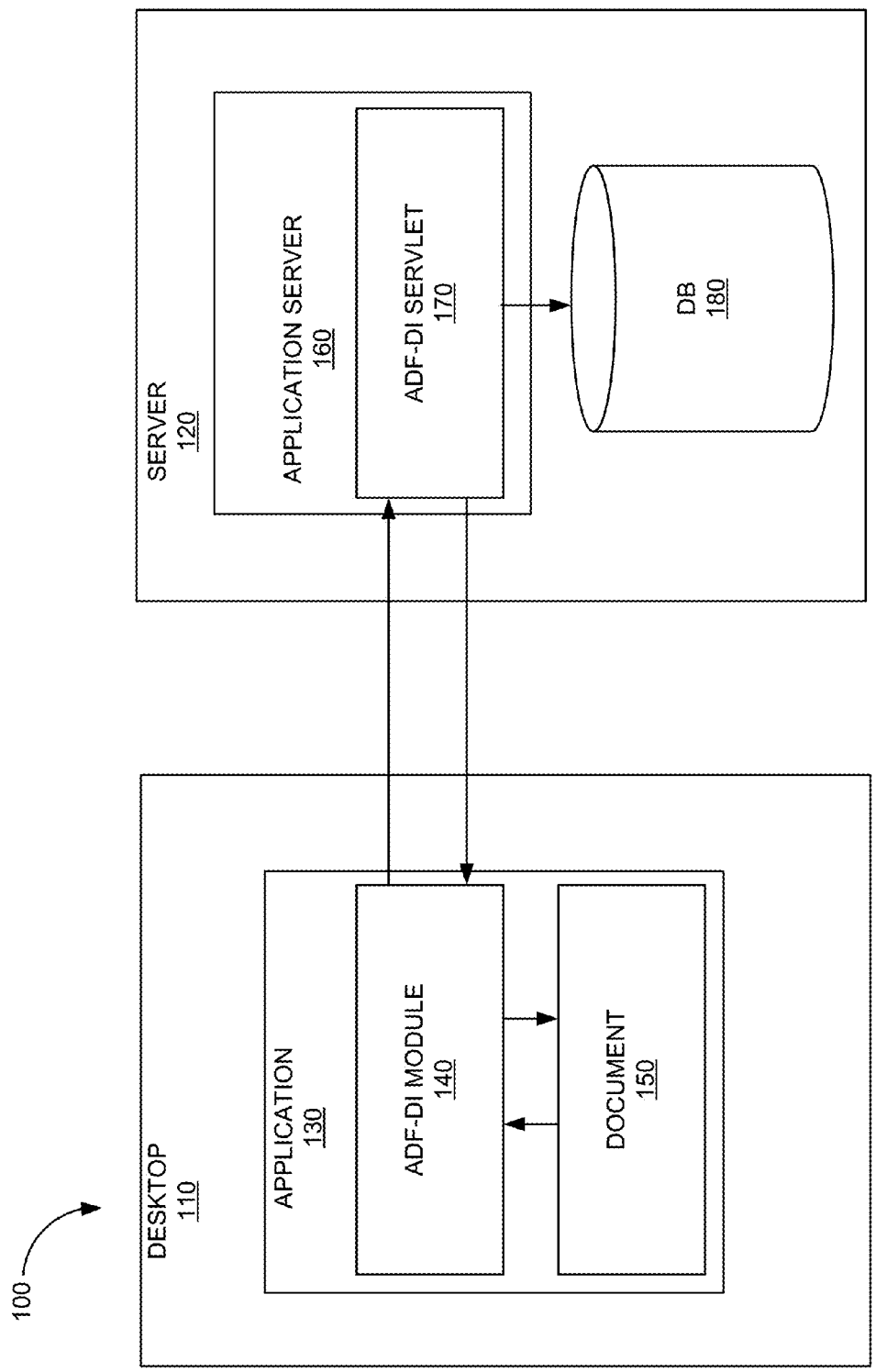
FIG. 1 is a block diagram illustrating a desktop integration framework in one embodiment according to the present invention.

FIG. 1 is a block diagram illustrating desktop integration framework 100 in one embodiment according to the present invention. Desktop integration framework 100 may incorporate various embodiments or implementations of the one or more inventions presented within this disclosure. Desktop integration framework 100 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

In this example, desktop integration framework 100 includes desktop 110 and server 120. Desktop 110 is representative of hardware and/or software elements configured to provide access to application 130. Desktop 110 may include one or more operating systems, applications, browser, and the like executing on one or more computer systems. Desktop 110 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

Application 130 is representative of one or more software elements that allow users to generate, edit, or otherwise interact with documents. Some examples of application 130 are editors, word processing applications, spreadsheet applications, image editing and manipulation programs, and the like. In various embodiments, desktop integration framework 100 operates with configurations specific to Microsoft Office products, such as Microsoft Word and Microsoft Excel.

Application 130 further includes ADF-DI module 140 and document 150. ADF-DI module 140 is representative of one or more software elements that extend the functionality provided by web-based or other network-accessible applications to application 130. For example, ADF-DI module 140 allows end users to avail themselves of a familiar user interface associated with application 130 to undertake information management tasks using document 150. These tasks may be alternatively performed by or handled by web-based or other network-accessible applications hosted by server 120. In various embodiments, data manipulated by such information management tasks performed in application 130 is synchronized with server 120.

Server 120 is representative of hardware and/or software elements configured to provide access to application server 160. Server 120 may include one or more operating systems, servers, services, applications, and the like executing on one or more computer systems. Server 120 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

Application server 160 is representative of one or more software elements that allow users to interact with web-based or network-based applications, such as ADF-DI servlet 170. Some examples of application server 160 are either a software framework that provides a generalized approach to creating an application-server implementation, without regard to what the application functions are, or the server portion of a specific implementation instance. In various embodiments, application server 160 operates with configurations specific to Java Platform, Enterprise Edition or Java EE that defines a core set of API and features of Java Application Servers. Application server 1560 may include servlets, and JavaServer Pages, Enterprise JavaBeans, and the like. Application server 160 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

ADF-DI servlet 170 is representative of one or more server components, such as part of application server 160. In general, ADF-DI module 140 acts as a View/Controller and communicates with ADF-DI servlet 170 to synchronize data and execute business logic in a model layer of application server 160. The model layer represents the data values related to a current page, along with model-level business rules, security, and application logic used against the data values. The view layer contains any UI pages used to view or modify that data. The controller layer processes user input and determines page navigation. The business service layer handles data access and encapsulates business logic. In this example, ADF-DI module 140 and ADF-DI servlet 170 allows end users to avail themselves of a familiar user interface associated with application 130 to undertake View/Controller tasks using document 150.

In general, a developer utilizes ADF-DI module 140 to work within application 130 to create document 150 in a design mode. The developer structures and formats document 150 in a desired manner utilizing native tools of application 130. The developer then can add components to document 150 using ADF-DI module 140 to integrate document 150 with application server 160. Some examples of components are input components (e.g., form components), output components, labels, lists, buttons, images, tables, and the like.

The developer can then bind the UI components attributes of models maintained by application server 160. For example, the developer can bind a text box UI component with the attributes of a model of a customer entity allowing customer records maintained by application server 160 to be viewed or modified within document 150. Once all desired components are included and mapped to data accessible to application server 160 in database 180, document 150 can be "published" or otherwise made available on application server 160. Application server 160 may provide a download link the published documents enabling users to access the documents via a browser.

In some embodiments, a published document includes all document metadata. In various embodiments, published documents are stored separately than document metadata that defines components, data mappings, and any logic a developer associated with the document. This allows the published document and the document metadata to be independently managed for purposes, such as protected access and template revisions.

During runtime, a user downloads published document 150 and opens it with application 130. ADF-DI module 140 detects that document 150 has been authored to include framework components and contacts ADF-DI servlet 170 to request document metadata, actual data, and any logic that needs to be performed. ADF-DI module 140 then receives the document metadata, actual data, and any logic from ADF-DI servlet 170 and renders the document contents. For example, ADF-DI module 140 can determine placement of various UI components, style information associated with the UI components, data to be obtained from application server 160 to be placed within the UI components, as well as perform any logic or processing based on the data.

Accordingly, a user may retrieve a document template and have the document content automatically updated and formatted based on processing performed by ADF-DI module 140 and data obtained from application server 160. The user can then avail themselves of the familiar user interface associated with application 130 to undertake tasks using document 150. ADF-DI module 140 and ADF-DI servlet 170 may remain in communication to send and receive updates accordingly.

Custom Attribute Properties

In the past, industry typically abandons the declarative approach to application development provided by Oracle ADF for cases when a model's attributes are insufficient to drive dynamic interactions within integrated documents. Developers may revert to older programmatic strategies, which can involve maintaining server-side code. Furthermore, UI components bound to a model's attributes can include standard (non-custom) attribute properties (i.e., attribute properties that are common to all UIs, such as an attribute's label property) and non-standard (custom) attribute properties (i.e. attribute properties that are specific to the desktop application, such as an attribute's cell style property). For cases when a model's attributes, and associated standard attribute properties (for example, an attribute label property), are insufficient to drive dynamic interactions within integrated documents, various embodiments of the present invention allow the declarative approach to be extended by having desktop integration framework 100 provide evaluation support for custom attribute properties. Desktop integration framework 100 allows a developer to create custom properties for model attributes associated with elements of document 150 that are driven by model metadata.

Custom properties can be defined on model attributes and referenced using one or more expressions bound to UI components. This is a significant improvement over previous solutions that required extensive and complicated server-side programming. For example, integrated workbook developers can bind such custom properties UI components. In one embodiment, integrated workbook developers can bind custom properties to ADFdi dynamic columns. A dynamic column can be added to a table UI component so that the table UI component expands or contracts at runtime (e.g., depending on the available attributes returned by a view object).

At design time, not all of the required columns are known to the UI component. Thus, certain EL-based properties, such as column cell style, have been required to be configured as distinct, non-dynamic, columns in order to have column-specific styles applied. This required extra work on the part of the developer as there was no way to configure a dynamic column expression that would evaluate differently based on the model attribute alone.

Accordingly, in one embodiment, server-side support is provided for delivering custom attribute property values to clients. ADFdi EL also expands evaluation to support custom server-side attribute properties. Rather than treating a binding as a literal within an expression, ADF-DI module 140 can request the value of the custom property from ADF-DI servlet 170 at runtime and evaluate the expression using that result. Thus, certain EL-based properties, such as column cell style, can have column-specific styles applied at runtime.

Figure 2:
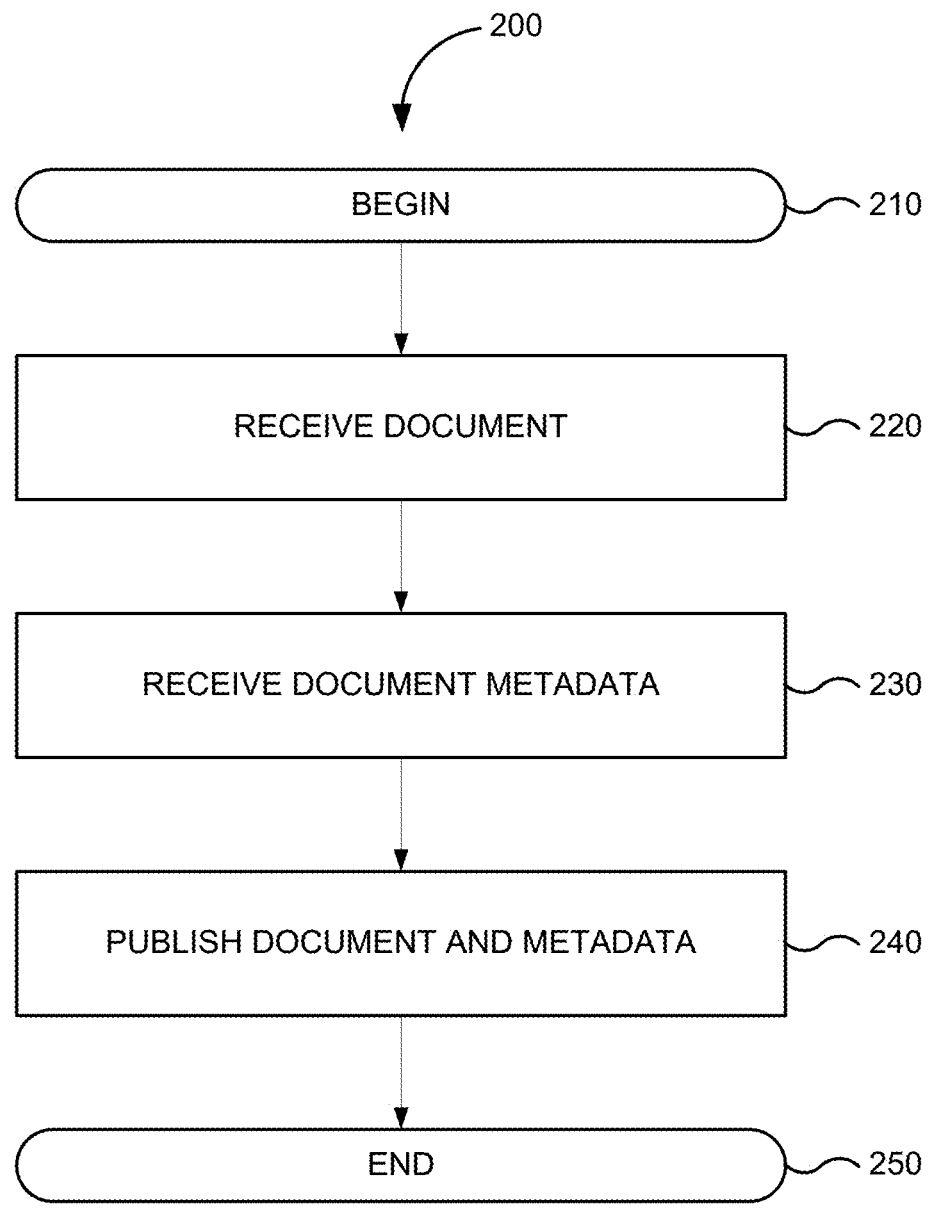
FIG. 2 is a flowchart of a method for designing a document using the desktop integration framework of FIG. 1 to provide support for custom attribute properties in spreadsheet in one embodiment according to the present invention.

FIG. 2 is a flowchart of method 200 for designing a document using the desktop integration framework of FIG. 1 to provide custom attribute properties in spreadsheet software in one embodiment according to the present invention. Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

In step 220, a document is received. In general, the document is created by an application that natively creates such documents or using a library that creates the document in a native format. According to FIG. 1, a user can open an existing document or create a new document in application 130, such as creating a new spreadsheet in Microsoft Excel. A document developer may edit, structure, or format the document in any desired manner using native and non-native tools.

In step 230, document metadata is received. The document metadata includes information utilized by ADF-DI module 140 to render contents of the document based on data obtained from application server 160. In one aspect, the document metadata identifies each component included in the document and how a component is bound to one or more objects in database 180. Document metadata may further provide access information, static data, and other logic or data manipulation information provided by the developer.

Figure 3A:
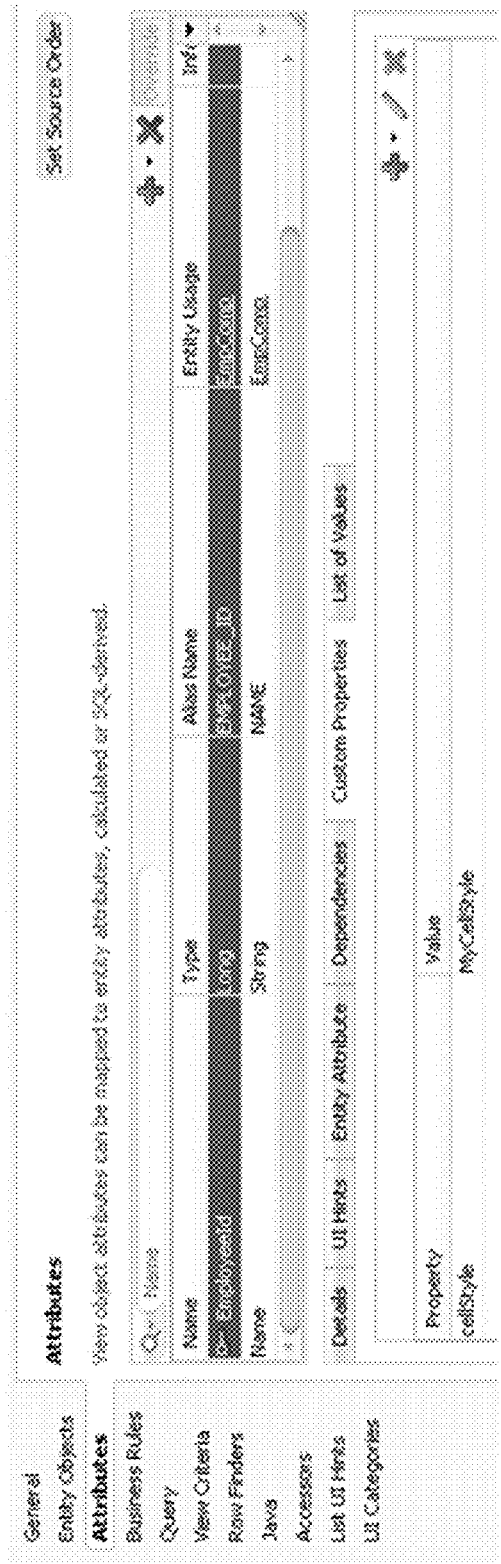
FIG. 3A is screenshot of a set of custom attribute properties defined on an attribute of a data model in one embodiment according to the present invention.

As discussed above, a workbook developer can configure one or more UI computers with one or more expressions that reference custom attribute properties. For example, FIG. 3A is screenshot of a set of custom attribute properties in one embodiment according to the present invention. In this example, the workbook developer configures a custom attribute property for a model attribute "EmployeeId" of a view object for an employee entity maintained by application server 160. The EmployeeId attribute can have various properties as defined in the tabs shown in FIG. 3A. These properties can explicitly define or inherited from the employee entity, from the type of attribute definition, or the like. In this example, a property of "cellStyle" is added to the EmployeeId attribute with a value of "MyCellStyle." This allows a UI component bound to the EmployeeId attribute to be given a particular style of MyCellStyle when an expression that requests or references the cellStyle property is satisfied.

To enable evaluation at run-time, a workbook developer can set the following Worksheet property:
Name: CustomAttributePropertiesEnabled
Type: Boolean
Default: False (for old and new workbooks)
Category: Data
Composer: does not appear
Validation: n/a
Description: Indicates whether custom attribute properties are supported in EL expressions The workbook developer can then reference custom attribute properties within EL using, for example, one of the following forms:
  "#{bindings.{attr id}.hints.{custom property}}"[for attribute hint]
  "#{bindings.{tree id}.hints.{attr id}.{custom property}}" [for tree attribute hint]
  "#{bindings.{tree id}.[{node id}].hints.*.{custom property}}"[for dynamic column hint]

Example:
    #{bindings.EmpCompView1.hints.EmployeeId.cellStyle}

Figure 3B:
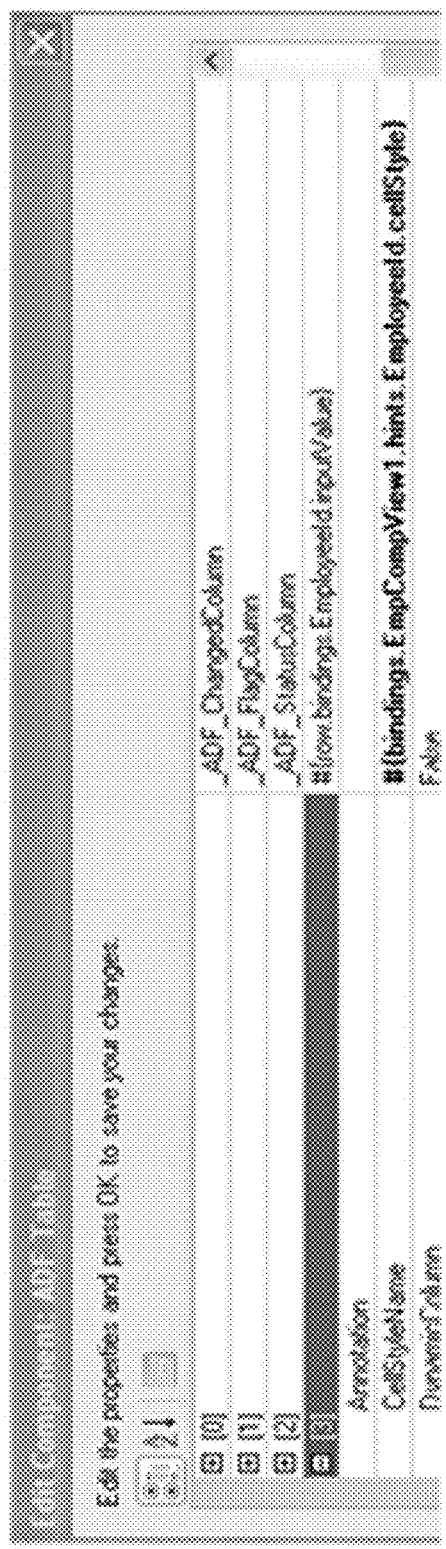
FIG. 3B is screenshot of a UI component definition with the use of expressions with custom attribute properties in one embodiment according to the present invention.

For example, FIG. 3B is screenshot of the use of expressions with custom attribute properties in one embodiment according to the present invention. In this example, the workbook developer configures a "CellStyleName" property for a UI component "ADF Table". An expression using a tree attribute hint is added referring to the "cellStyle" custom attribute property defined in FIG. 3A.

In step 240, the document and the document metadata are published. Published documents can be stored separately than the document metadata. In some embodiments, a published document may include all or part of the document metadata. In general, the published document includes at least enough metadata that enables ADF-DI module 140 to initialize the document and request additional information from ADF-DI servlet 170 to render the contents of the document. FIG. 2 ends in step 250.

Figure 4:
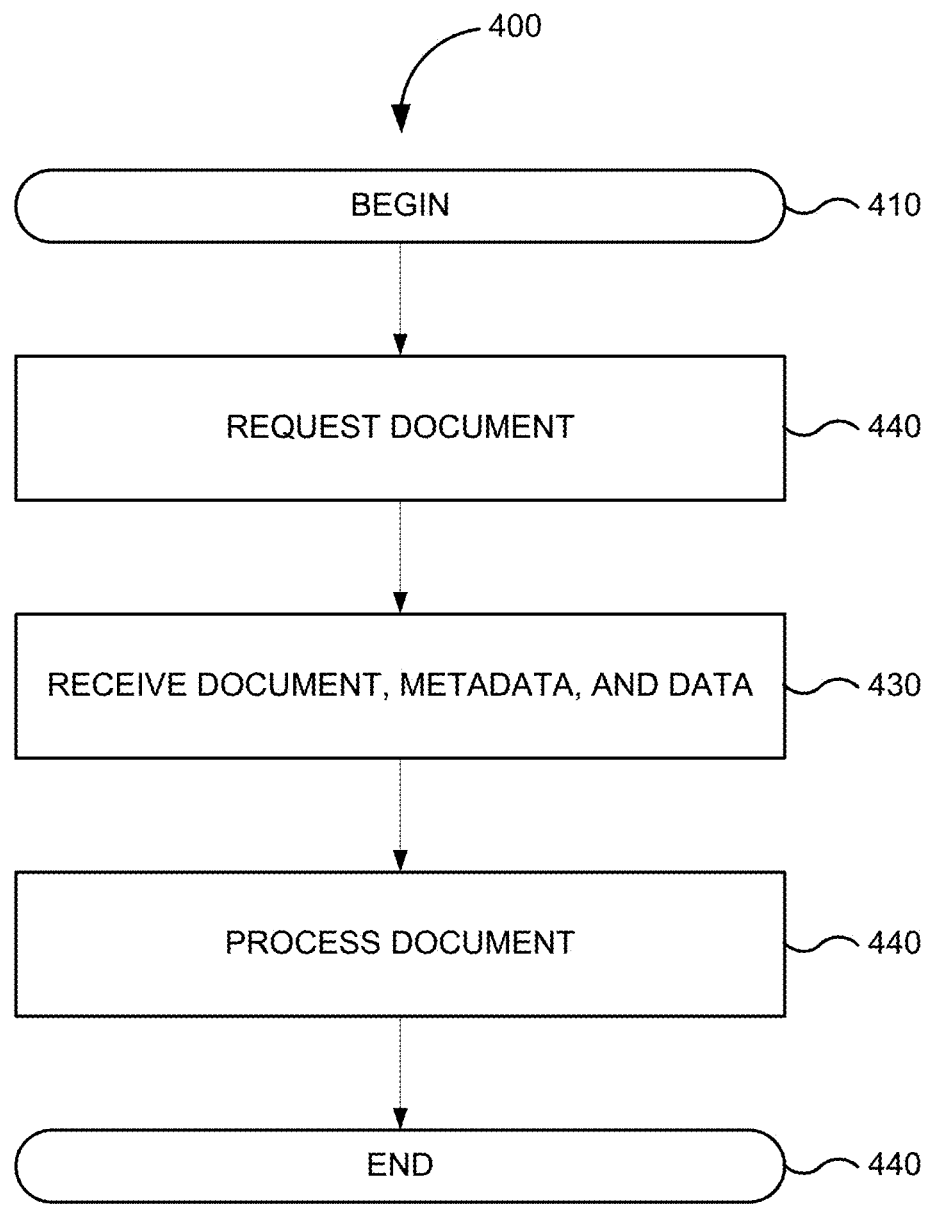
FIG. 4 is a flowchart of a method for running a document using the desktop integration framework of FIG. 1 that includes support for custom attribute properties in one embodiment according to the present invention.

FIG. 4 is a flowchart of method 400 for running a document using desktop integration framework 100 of FIG. 1 that includes one or more custom attribute properties in one embodiment according to the present invention. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 400 begins in step 410.

In step 420, a document is request. For example, a user may request to download published document 150 from application server 160.

In step 430, the document, document metadata, and data are received. A download may complete with the published document 150 at which time document 150 can be opened with application 130. ADF-DI module 140 may then detect that document 150 needs to be rendered. ADF-DI module 140 contacts ADF-DI servlet 170 and obtains the document metadata and any actual data to be rendered according to the design of the document.

In step 440, the document is processed. ADF-DI module 140 determines the placement of components and renders them as the contents of the document utilizing the actual data provided by ADF-DI servlet 170.

Figure 3C:
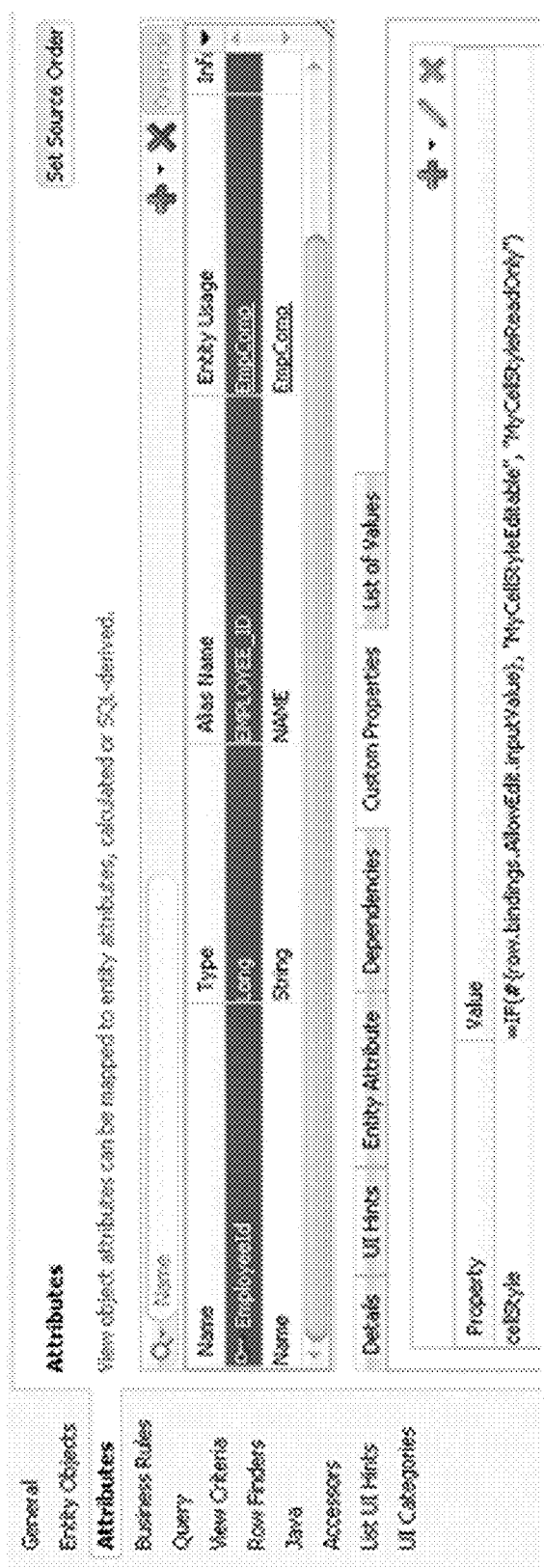
FIG. 3C is screenshot of a set of custom attribute properties defined on an attribute of a data model using an EL expression in one embodiment according to the present invention.

In one embodiment, ADF-DI module 140 renders UI components based on their custom attribute properties. When CustomAttributePropertiesEnabled is True, ADFdi EL will evaluate custom attribute property values returned from the server. If the custom property value is itself an EL expression (rather than a literal value), the returned property value gets re-evaluated as EL. For example, as in FIG. 3C, if the cellStyle property value is "=IF(#{row.bindings.AllowEdit.inputValue}, "MyCellStyleEditable", "MyCellStyleReadOnly")", the cellStyle property value EL gets re-evaluated for each row (to apply cell style based on the current row's AllowEdit attribute value)

In one aspect, EL evaluation of an invalid custom property causes EL to evaluate to an empty string and log a warning. An EL property value evaluates to a default value in some cases. Examples of invalid custom property names in EL:
    If CustomAttributePropertiesEnabled is False, all custom property names are considered invalid
    Custom property name is specified in EL that is not defined on the server.
    If a custom property name matches a reserved hint name (e.g. "label"), the custom property is ignored.

FIG. 4 ends in step 450.

Formula Example

Figure 3D:
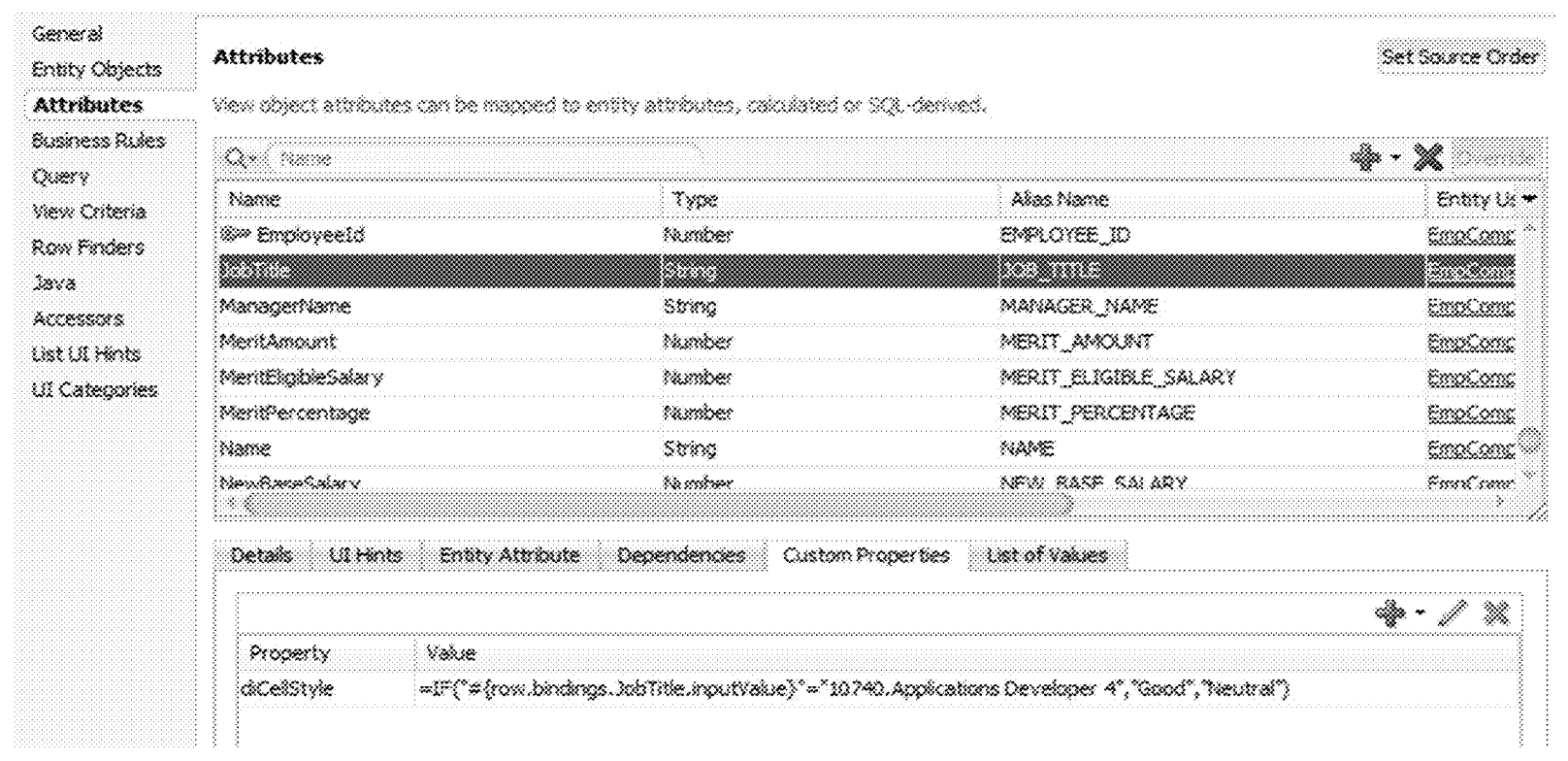

In one example, FIG. 3D shows a diCellStyle property value as "=IF("#{row.bindings.JobTitle.inputValue}"="10740.Applications Developer 4", "Good", "Neutral")." Therefore, the diCellStyle property value EL gets re-evaluated for each row. As show in FIG. 3E, at runtime, the cell style for JobTitle cell style gets applied during download based on the current row's JobTitle attribute value.

Conclusion

Systems depicted in some of the figures may be provided in various configurations. In some embodiments, the systems may be configured as a distributed system where one or more components of the system are distributed across one or more networks in a cloud computing system.

Figure 5:
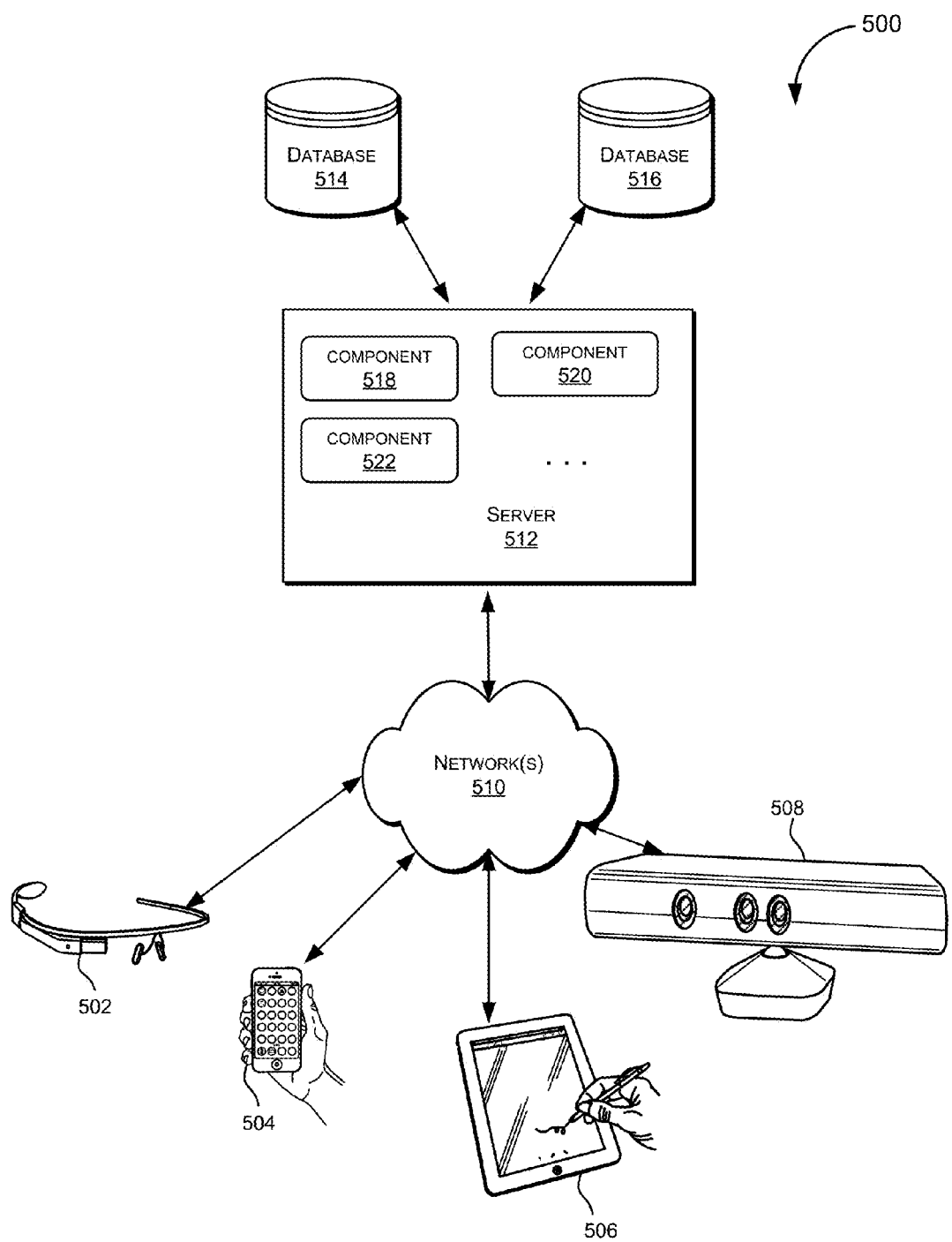
FIG. 5 depicts a simplified diagram of a distributed system for implementing one of the embodiments.

FIG. 5 depicts a simplified diagram of a distributed system 500 for implementing one of the embodiments. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications provided by one or more of the components of the system. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like. Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 502.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like.

Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands.

Figure 6:
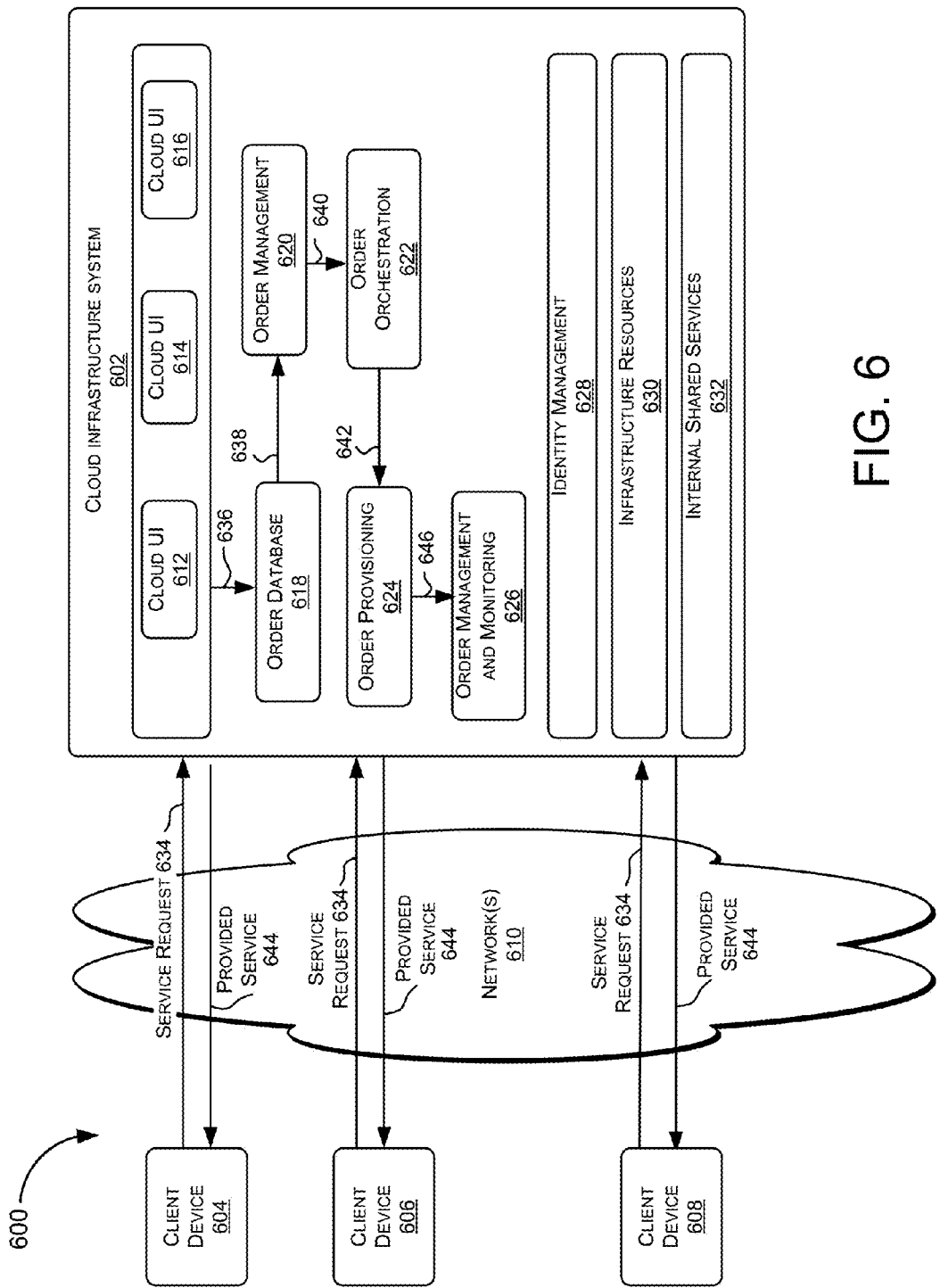
FIG. 6 is a simplified block diagram of components of a system environment by which services provided by the components of an embodiment system may be offered as cloud services, in accordance with an embodiment of the present disclosure.

FIG. 6 is a simplified block diagram of one or more components of a system environment 600 by which services provided by one or more components of an embodiment system may be offered as cloud services, in accordance with an embodiment of the present disclosure. In the illustrated embodiment, system environment 600 includes one or more client computing devices 604, 606, and 608 that may be used by users to interact with a cloud infrastructure system 602 that provides cloud services. The client computing devices may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in the figure may have other components than those depicted. Further, the embodiment shown in the figure is only one example of a cloud infrastructure system that may incorporate an embodiment of the invention. In some other embodiments, cloud infrastructure system 602 may have more or fewer components than shown in the figure, may combine two or more components, or may have a different configuration or arrangement of components.

Client computing devices 604, 606, and 608 may be devices similar to those described above for 502, 504, 506, and 508.

Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that can support data communications using any of a variety of commercially-available protocols, including those described above for network(s) 510.

Cloud infrastructure system 602 may comprise one or more computers and/or servers that may include those described above for server 512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform.

In some embodiments, resources in cloud infrastructure system 602 may be shared by multiple users and dynamically re-allocated per demand. Additionally, resources may be allocated to users in different time zones. For example, cloud infrastructure system 630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 and by the services provided by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in the figure, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In exemplary operation 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI), cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

After an order has been placed by the customer, the order information is received via the cloud UIs, 612, 614 and/or 616.

At operation 636, the order is stored in order database 618. Order database 618 can be one of several databases operated by cloud infrastructure system 618 and operated in conjunction with other system elements.

At operation 638, the order information is forwarded to an order management module 620. In some instances, order management module 620 may be configured to perform billing and accounting functions related to the order, such as verifying the order, and upon verification, booking the order.

At operation 640, information regarding the order is communicated to an order orchestration module 622. Order orchestration module 622 may utilize the order information to orchestrate the provisioning of services and resources for the order placed by the customer. In some instances, order orchestration module 622 may orchestrate the provisioning of resources to support the subscribed services using the services of order provisioning module 624.

In certain embodiments, order orchestration module 622 enables the management of business processes associated with each order and applies business logic to determine whether an order should proceed to provisioning. At operation 642, upon receiving an order for a new subscription, order orchestration module 622 sends a request to order provisioning module 624 to allocate resources and configure those resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. Order orchestration module 622 may thus be isolated from implementation details, such as whether or not services and resources are actually provisioned on the fly or pre-provisioned and only allocated/assigned upon request.

At operation 644, once the services and resources are provisioned, a notification of the provided service may be sent to customers on client devices 604, 606 and/or 608 by order provisioning module 624 of cloud infrastructure system 602.

At operation 646, the customer's subscription order may be managed and tracked by an order management and monitoring module 626. In some instances, order management and monitoring module 626 may be configured to collect usage statistics for the services in the subscription order, such as the amount of storage used, the amount data transferred, the number of users, and the amount of system up time and system down time.

In certain embodiments, cloud infrastructure system 600 may include an identity management module 628. Identity management module 628 may be configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 628 may also include the management of descriptive information about each customer and about how and by whom that descriptive information can be accessed and modified.

Figure 7:
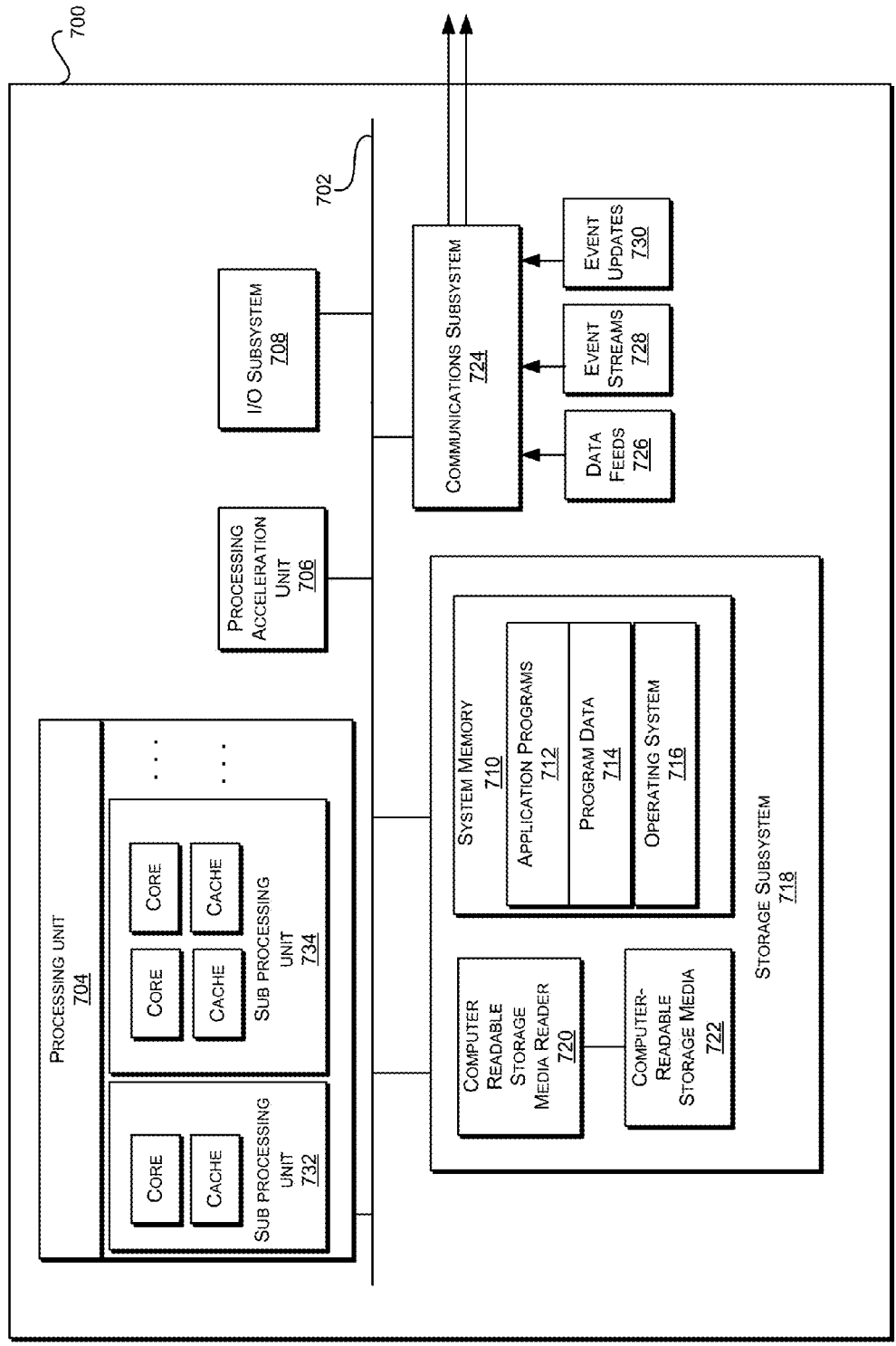
FIG. 7 illustrates an exemplary computer system, in which various embodiments of the present invention may be implemented.

FIG. 7 illustrates an exemplary computer system 700, in which various embodiments of the present invention may be implemented. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 7 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 720 that can further be connected to computer-readable storage media 722.

Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 502.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
receiving, at one or more computer systems, a document that references one or more user interface components, wherein the document is in a native application format associated with a native application,
wherein the native application includes or is in communication with an application server via an integration module of the native application, and wherein at least some of the user interface components correspond to one or more attributes of a data model of a web-based application that is in communication with the application server;

receiving, at the one or more computer systems, a value of a property defined by a user on an attribute of the data model, the value comprising an expression;

receiving, at the one or more computer systems, data representing the one or more attributes of the data model from the application server responsive to processing the one or more user interface components; and rendering, with one or more processors associated with the one or more computer systems, the document using the expression and the data, wherein the rendering the document comprises rendering the at least some of the user interface components by incorporating the data into the at least some of the user interface components based at least on evaluating the expression, and wherein the document is configured to act as a user interface for the web-based application by extending functionality provided by the web-based application to the native application, and the user interface comprises the at least some of the user interface components.

2. The method of claim 1, wherein receiving the expression comprises receiving an expression that conditions a visual style of a model attribute when rendered in the document.

3. The method of claim 1, wherein receiving the expression comprises receiving an expression that conditions a size of a model attribute when rendered in the document.

4. The method of claim 1, further comprising requesting the value of the property from the application server responsive to processing document metadata that defines the one or more user interface elements.

5. The method of claim 1, wherein at least one user interface component comprises a label, a text field, an image, a checkbox, or a table.

6. A non-transitory computer-readable medium storing instructions which when executed by a processor cause the processor to render a document within a native application as a user interface of a web application, non-transitory computer-readable medium comprising:

instructions that cause the processor to receive a document that references one or more user interface components, wherein the document is in a native application format associated with a native application, wherein the native application includes or is in communication with an application server via an integration module of the native application, and wherein at least some of the user interface components correspond to one or more attributes of a data model of a web-based application that is in communication with the an application server;

instructions that cause the processor to receive a value of a property defined by a user on an attribute of the data model, the value comprising an expression;

instructions that cause the processor to receive data representing the one or more attributes of the data model from the application server responsive to processing the one or more user interface components; and instructions that cause the processor to render the document using the expression and the data, wherein the rendering the document comprises rendering the at least some of the user interface components by incorporating the data into the at least some of the user interface components based at least on evaluating the expression, and wherein the document is configured to act as a user interface for the web-based application by extending functionality provided by the web-based application to the native application, and the user interface comprises the at least some of the user interface components.

7. The non-transitory computer-readable medium of claim 6, wherein the instructions that cause the processor to receive the expression comprise instructions that cause the processor to receive an expression that conditions a visual style of a model attribute when rendered in the document.

8. The non-transitory computer-readable medium of claim 6, wherein the instructions that cause the processor to receive the expression comprise instructions that cause the processor to receive an expression that conditions a size of a model attribute when rendered in the document.

9. The non-transitory computer-readable medium of claim 6, further comprising instructions that cause the processor to request the value of the property from the application server responsive to processing document metadata that defines the one or more user interface elements.

10. The non-transitory computer-readable medium of claim 6, wherein at least one user interface component comprises a label, a text field, an image, a checkbox, or a table.

11. A system comprising:
a processor; and
a memory comprising:
instructions that cause the processor to receive a document that references one or more user interface components, wherein the document is in a native application format associated with a native application, wherein the native application includes or is in communication with an application server via an integration module of the native application, and wherein at least some of the user interface components correspond to one or more attributes of a data model of a web-based application that is in communication with the an application server;

instructions that cause the processor to receive a value of a property defined by a user on an attribute of the data model, the value comprising an expression;

instructions that cause the processor to receive data representing the one or more attributes of the data model from the application server responsive to processing the one or more user interface components; and instructions that cause the processor to render the document using the expression and the data, wherein the rendering the document comprises rendering the at least some of the user interface components by incorporating the data into the at least some of the user interface components based at least on evaluating the expression, and wherein the document is configured to act as a user interface for the web-based application by extending functionality provided by the web-based application to the native application, and the user interface comprises the at least some of the user interface components.

12. The system of claim 11, wherein the instructions that cause the processor to receive the expression comprise instructions that cause the processor to receive an expression that conditions a visual style of a model attribute when rendered in the document.

13. The system of claim 11, wherein the instructions that cause the processor to receive the expression comprise instructions that cause the processor to receive an expression that conditions a size of a model attribute when rendered in the document.

14. The system of claim 11, further comprising instructions that cause the processor to request the value of the property from the application server responsive to processing document metadata that defines the one or more user interface elements.

15. The system of claim 11, wherein at least one user interface component comprises a label, a text field, an image, a checkbox, or a table.

* * * * *

UNITED STATES PATENT AND TRADEMARK OFFICE
CERTIFICATE OF CORRECTION

PATENT NO. : 9,948,700 B2
APPLICATION NO. : 14/753459
DATED : April 17, 2018
INVENTOR(S) : Rowles et al.

Page 1 of 1

It is certified that error appears in the above-identified patent and that said Letters Patent is hereby corrected as shown below:

In the Specification

In Column 7, Line 59, after "value)" insert -- . --.

In Column 7, Line 65, after "invalid" insert -- . --.

In Column 9, Line 28, delete "infra-red" and insert -- infrared --, therefor.

Signed and Sealed this
Fourth Day of September, 2018

Andrei Iancu
*Director of the United States Patent and Trademark Office*